US011978111B2

(12) United States Patent
He

(10) Patent No.: US 11,978,111 B2
(45) Date of Patent: May 7, 2024

(54) OBJECT VIRTUALIZATION PROCESSING METHOD AND DEVICE, ELECTRONIC DEVICE AND STORAGE MEDIUM

(71) Applicants: Beijing Jingdong Shangke Information Technology Co., Ltd., Beijing (CN); Beijing Jingdong Century Trading Co., Ltd., Beijing (CN)

(72) Inventor: Jinping He, Beijing (CN)

(73) Assignees: Beijing Jingdong Shangke Information Technology Co., Ltd., Beijing (CN); Beijing Jingdong Century Trading Co., Ltd., Beijing (CN)

(*) Notice: Subject to any disclaimer, the term of this patent is extended or adjusted under 35 U.S.C. 154(b) by 273 days.

(21) Appl. No.: 17/430,853

(22) PCT Filed: Jan. 3, 2020

(86) PCT No.: PCT/CN2020/070203
§ 371 (c)(1),
(2) Date: Aug. 13, 2021

(87) PCT Pub. No.: WO2020/173222
PCT Pub. Date: Sep. 3, 2020

(65) Prior Publication Data
US 2022/0164863 A1    May 26, 2022

(30) Foreign Application Priority Data
Feb. 28, 2019  (CN) .......................... 201910150192.7

(51) Int. Cl.
*G06Q 30/00*   (2023.01)
*G06Q 30/0601* (2023.01)
*G06T 19/20*   (2011.01)

(52) U.S. Cl.
CPC ......... *G06Q 30/0643* (2013.01); *G06T 19/20* (2013.01); *G06T 2219/2004* (2013.01)

(58) Field of Classification Search
CPC .......................... G06Q 30/06–08; G06T 19/20
See application file for complete search history.

(56) References Cited

U.S. PATENT DOCUMENTS

2004/0243538 A1* 12/2004 Kockro .................. G06F 3/041
2006/0109269 A1*  5/2006 Jennings ................ G06T 19/20
                                                            345/424
(Continued)

FOREIGN PATENT DOCUMENTS

CN      1801218 A     7/2006
CN    102067132 A     5/2011
(Continued)

OTHER PUBLICATIONS

International Search Report for PCT/CN2020/070203, dated Apr. 1, 2020, 3 pgs.

(Continued)

Primary Examiner — Ethan D Civan
(74) Attorney, Agent, or Firm — Blank Rome LLP

(57) ABSTRACT

An object virtualization processing method and device, an electronic device and a storage medium, the method comprising: acquiring and displaying a virtual entity model which is constructed according to an actual object and which has editable external features (S101); constructing a virtual scenario that corresponds to an actual scenario and that is acquired by a terminal device according to the real scenario (S102); projecting the virtual entity model into the virtual scenario (S103); and receiving an editing operation for the editable external features of the virtual entity model, adjusting the virtual entity model according to the editing operation to obtain an adjusted virtual entity model, and display- (Continued)

ing the adjusted virtual entity model in the virtual scenario (S104).

13 Claims, 11 Drawing Sheets

(56) References Cited

U.S. PATENT DOCUMENTS

| | | | | |
|---|---|---|---|---|
| 2014/0176530 | A1* | 6/2014 | Pathre | G06T 19/20 |
| | | | | 345/419 |
| 2015/0062123 | A1* | 3/2015 | Yuen | G06T 19/20 |
| | | | | 345/420 |
| 2018/0101986 | A1* | 4/2018 | Burns | G06T 19/006 |
| 2018/0374274 | A1* | 12/2018 | Selvarajan | G06T 15/04 |
| 2019/0279432 | A1* | 9/2019 | Lin | G06T 19/20 |
| 2020/0209009 | A1* | 7/2020 | Zhang | G01C 21/3841 |

FOREIGN PATENT DOCUMENTS

| | | |
|---|---|---|
| CN | 102800121 A | 11/2012 |
| CN | 106683193 A | 5/2017 |
| CN | 107016704 A | 8/2017 |
| CN | 108269307 A | 7/2018 |
| CN | 108510597 A | 9/2018 |
| CN | 108805679 A | 11/2018 |
| CN | 109087369 A | 12/2018 |
| CN | 109191590 A | 1/2019 |

OTHER PUBLICATIONS

Z. Yang, et al., "A Method of Point Positioning in a Virtual 3D Scene", Computer Knowledge and Technology, vol. 13, No. 9, Mar. 2017, pp. 187-189.

* cited by examiner

OBJECT VIRTUALIZATION PROCESSING METHOD AND DEVICE, ELECTRONIC DEVICE AND STORAGE MEDIUM

The present application is a national stage of International Application No. PCT/CN2020/070203, filed on Jan. 3, 2020, which claims the priority of Chinese Patent Application No. 201910150192.7, titled "METHOD AND APPARATUS FOR VIRTUALIZED PROCESSING OF OBJECT, ELETRONIC DEVICE AND STORAGE MEDIUM", filed on Feb. 28, 2019. Both of the aforementioned applications are hereby incorporated by reference in their entireties.

TECHNICAL FIELD

The present disclosure relates to the field of Internet technology, in particular to a method and apparatus for virtualized processing of an object, an electronic device and a storage medium.

BACKGROUND

With the continuous growth of e-commerce in the Internet field, it has become very important for e-commerce companies to provide customers with better consumer experiences. E-commerce platforms generally simply display photos of products, which are however far from reaching the expectations of manufacturers and consumers. In the related technology, the manufacturers design the products and put the photos corresponding to the products on the e-commerce platforms for display, and the consumers decide whether to purchase according to the photos of the products.

On some e-commerce platforms, real products can already be made into virtual entity models through virtual model technology, and the virtual entity models can be displayed from multiple angles, so that products can be displayed more comprehensively and the display efficiency can be improved.

SUMMARY

According to some embodiments of the present disclosure, a method for virtualized processing of an object, executed by a terminal device, includes:

acquiring and displaying a virtual entity model having an editable external feature and constructed according to a real object;

constructing a virtual scene corresponding to the real scene according to the real scene acquired by the terminal device;

projecting the virtual entity model into the virtual scene; and receiving an editing operation on the editable external feature of the virtual entity model, adjusting the editable external feature according to the editing operation to obtain an adjusted virtual entity model, and displaying the adjusted virtual entity model in the virtual scene.

According to some embodiments of the present disclosure, an apparatus for virtualized processing of an object includes:

a model acquisition module configured to acquire and display a virtual entity model having an editable external feature and constructed according to a real object;

a scene construction module configured to construct a virtual scene corresponding to the real scene according to the real scene;

a model projection module configured to project the virtual entity model into the virtual scene; and a module editing module configured to receive an editing operation on the editable external feature of the virtual entity model, adjust the editable external feature according to the editing operation to obtain an adjusted virtual entity model, and display the adjusted virtual entity model in the virtual scene.

According to some embodiments of the present disclosure, an electronic device includes:

a processor; and a memory connected to the processor, where the memory stores machine-readable instructions, and the machine-readable instructions may be executed by the processor to complete the method for virtualized processing of an object.

According to some embodiments of the present disclosure, a non-transitory computer-readable storage medium stores a computer program, which when executed by a processor, realizes steps of the method for virtualized processing of an object.

As can be seen from the above, based on the above embodiments, the method for virtualized processing of an object according to the present disclosure may construct the virtual entity model having the editable external feature for the real object, project the virtual entity model into the virtual scene constructed according to the real scene, and edit the editable external feature of the virtual entity model according to the projection effect of the virtual entity model in the real scene to obtain the customized virtual entity model, i.e., the adjusted virtual entity model.

DETAILED DESCRIPTION OF EMBODIMENTS

In order to make the purpose, technical solutions and advantages of the present disclosure clearer, the present disclosure is further described in detail below with reference to the accompanying drawing and embodiments.

On some e-commerce platforms, a real object can already be constructed into a virtual entity model through virtual model technology, and the virtual entity model can be displayed from multiple angles, but the virtual entity model currently remains only at the stage of display. Users cannot make any changes to the virtual entity model based on their needs.

A method for virtualized processing of an object according to the present disclosure may construct a virtual entity model having an editable customized feature for a real object, perform virtualized customization to obtain a customized virtual entity model by comparing effects in the virtual scene constructed based on a real scene, and finally further generate an actual product according to the customized virtual entity model, thereby solving the technical problem that the object cannot be customized according to the effect in the scene. In this way, the object can be displayed more efficiently and the display efficiency is improved. Finally, the actual product may be further generated according to the customized virtual entity model.

Figure 1:
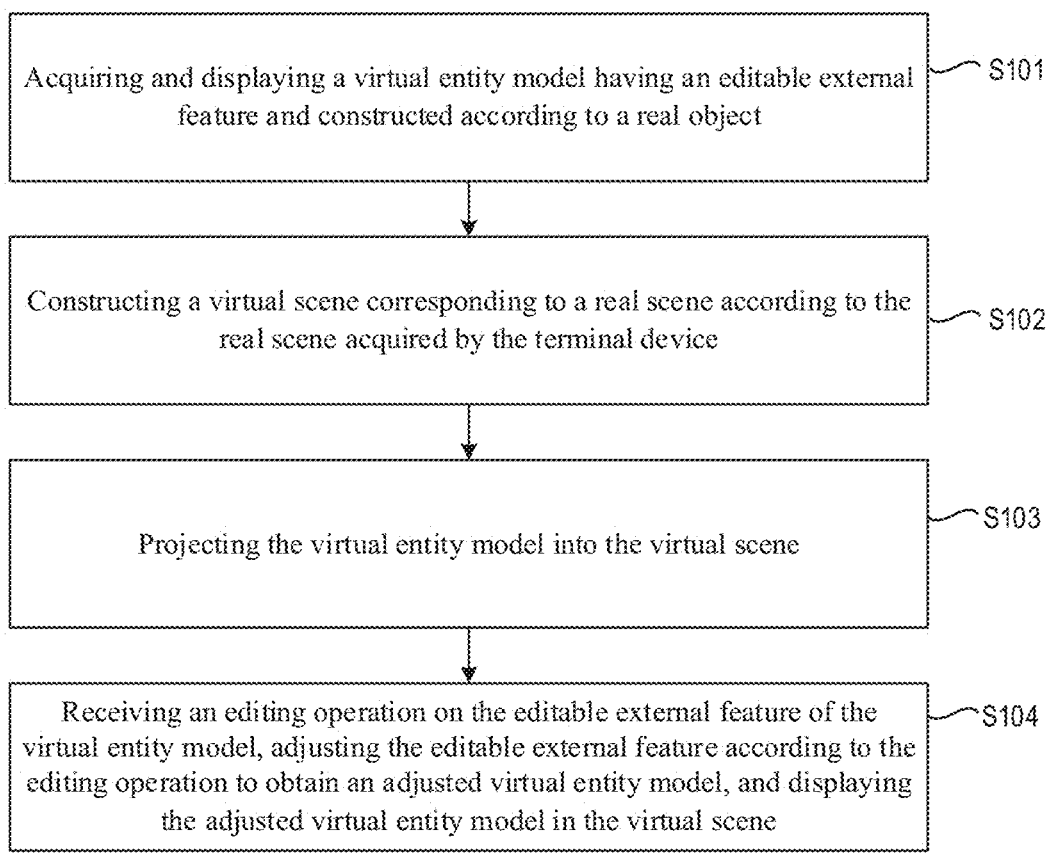
FIG. 1 is a schematic flowchart of a method for virtualized processing of an object according to some embodiments of the present disclosure.

FIG. 1 is a schematic flowchart of a method for virtualized processing of an object according to some embodiments of the present disclosure. The method may be executed by any computer device having a data processing capability such as a terminal device, which may be an intelligent terminal device such as a personal computer (PC) or a notebook computer, or may be an intelligent mobile terminal device such as a smartphone or a tablet computer. As shown in FIG. 1, in some embodiments, a method for virtualized processing of an object is provided, and the method includes steps S101 to S104.

S101 includes acquiring and displaying a virtual entity model having an editable external feature and constructed according to a real object.

In some embodiments, the construction of the virtual entity model may be completed by another terminal device or server, and stored in the server, and the terminal device may acquire the virtual entity model from the server and display the virtual entity model after receiving an instruction of displaying the virtual entity model.

In this step, the real object (product) is first modeled, and it should be noted that the real object in this step is not necessarily a tangible object, but may be an idea of an object design in the mind of a designer. The virtual entity model in this step is a two-dimensional (2D) or three-dimensional (3D) entity model of the constructed object. In common modeling methods, an entity model may be constructed by using parameters and size, or may be constructed by using the entity scanning in reverse engineering.

In some embodiments, the editable external feature of the virtual entity model may be a feature of the virtual entity model such as a structure size, a surface color or a pattern, and may also be referred to as an editable customized feature or a customized feature. The structure size of the virtual entity model may be used as a customized feature, and if the structure size of the virtual entity model is used as the customized feature, a specific size parameter of the structure size should be editable. It should also be noted that other features except the structure, such as a surface color or pattern of the object, which need to be customized, may be constructed. To facilitate subsequent editing, the virtual entity model may be designed to be white to facilitate painting in subsequent customization. The structure, color, and pattern are merely examples to better illustrate this step, and are not intended to specifically limit the customized features.

In some embodiments, the virtual entity model is divided into multiple model areas, and each model area has an independently editable external feature, i.e., the external feature of each model area may be edited independently.

For example, the virtual entity model may be divided into multiple model areas according to the structure of the virtual entity model, or meshes may be laid on the surface of the virtual entity model, and the virtual entity model may be divided into multiple model areas according to the meshes, for example, each mesh is used as a model area.

S102 includes constructing a virtual scene corresponding to a real scene according to the real scene acquired by the terminal device.

This step may use a static image photographed by a camera of the terminal device from the real scene as the virtual scene, or use a dynamic video obtained by video recording from the real scene as the virtual scene. The photographing and video recording methods for acquiring the real scene are merely examples, and the real scene may be acquired in other ways for constructing the virtual scene.

S103 includes projecting the virtual entity model into the virtual scene.

This step mainly establishes a connection between the virtual entity model and the virtual scene to improve the user experience. In addition, it should be pointed out that the virtual scene has a visual influence on the virtual entity model from many aspects such as space, color and layout.

S104 includes receiving an editing operation on the editable external feature of the virtual entity model, adjusting the editable external feature according to the editing operation to obtain an adjusted virtual entity model, and displaying the adjusted virtual entity model in the virtual scene.

Effects in this step may be understood as effects of space, color, layout and the like. For example, if a real object is a sofa, then a virtual entity model constructed based on the sofa may be projected into a virtual scene constructed based on reality, and the virtual scene may be consumer home environment. After the virtual entity model is projected into the virtual scene, a real effect of the virtual entity model in the real virtual scene is displayed. The consumer may edit a customized feature according to the real effect, and may repeatedly compare the effects of the virtual entity model in the virtual scene after editing.

In this embodiment, a merchant models its own actual real object (a product) to generate a virtual entity model. The modeling method may be a modeling method using parameters and size or a modeling method using an entity scanning. The virtual entity model is displayed on an e-commerce platform, and a consumer may construct a virtual scene by acquiring a real scene through photographing, video recording or the like. After the virtual entity model is projected into the virtual scene, a comparison effect is obtained according to a spatial relationship, a color relationship and a layout relationship of the virtual entity model in the virtual scene, to edit the customized features. After repeated comparisons, an expected customized virtual entity model is obtained. It should be noted that the effect may really be a quantitative relationship of parameters, for example, in a layout in which the sofa is placed in a space, whether the sofa interferes in the space. Alternatively, the effect may be a perceptual relationship, such as which color is more suitable for use in the virtual scene. Even though the virtual entity model and the virtual scene do not have above relationships, it may also improve the user experience by projecting the virtual entity model into the virtual scene and customizing the virtual entity model. After a final edited virtual entity model is obtained, the final edited virtual entity model is manufactured and processed to produce a corresponding product, so that not only the customization of the virtualization is realized, but also the customization of the actual product is realized.

Figure 2:
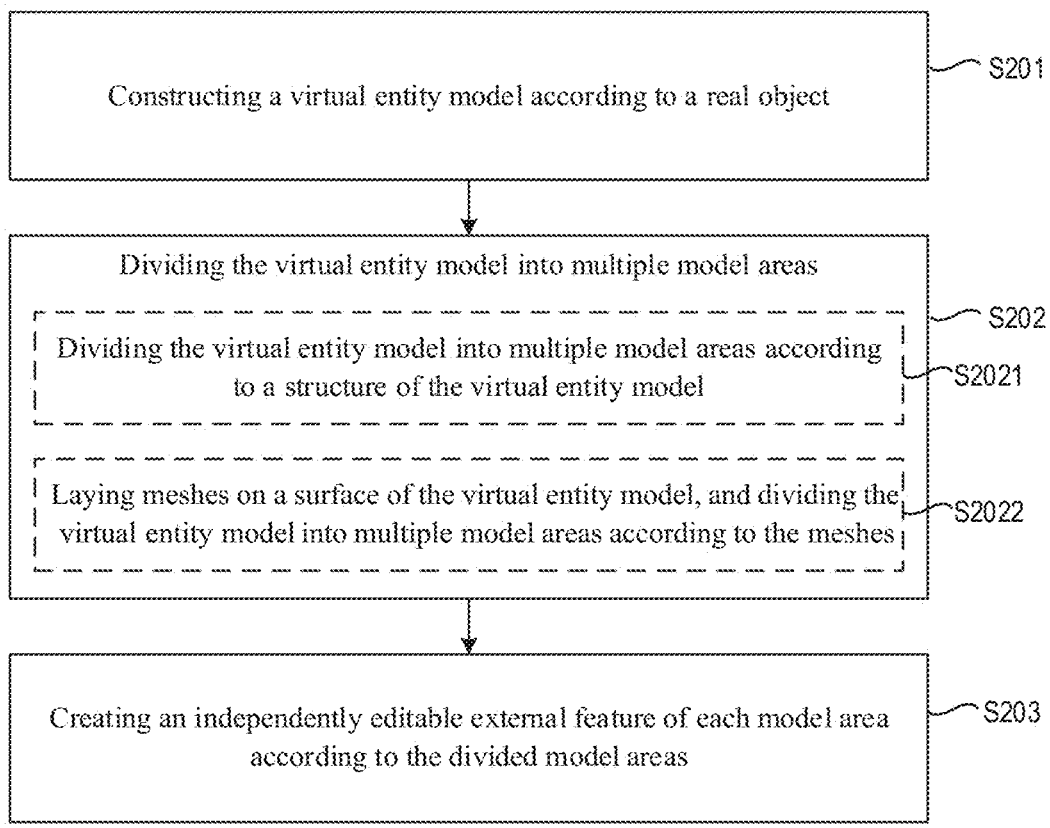
FIG. 2 is another schematic flowchart of the method for virtualized processing of an object according to some embodiments of the present disclosure.

FIG. 2 is another schematic flowchart of the method for virtualized processing of an object according to some embodiments of the present disclosure. As shown in FIG. 2, in some embodiments, the method further includes constructing a virtual entity model having an editable external feature and constructed according to a real object before the step S101, and specifically includes steps S201 to S203.

S201 includes constructing a virtual entity model according to a real object.

In this step, the virtual entity model is first constructed according to the real object. This step is actually to provide a carrier for subsequently setting a customized feature. Specifically, for example, when the customized feature is a size parameter of the model, the entity model feature of the virtual entity model is a carrier for constructing the customized feature. That is, the customized feature exists depending on the virtual entity model.

S202 includes dividing the virtual entity model into multiple model areas.

In this step, the dividing method may include any one of S2021 or S2022.

S2021 includes dividing the virtual entity model into multiple model areas according to a structure of the virtual entity model.

Dividing based on different entity model areas of the virtual entity model may provide a model basis for subsequently creating a customized feature based on the divided areas of the virtual entity model. Taking a sofa as an example, the virtual entity model of the sofa may be divided into areas such as an armrest of the sofa and a backrest of the sofa.

S2022 includes laying meshes on a surface of the virtual entity model, and dividing the virtual entity model into multiple model areas according to the meshes.

In this step, the virtual entity model is meshed so that a color of the virtual entity model may be better edited. The meshes are laid on the surface of the virtual entity model, and in some embodiments, a network of triangles may be used as the pattern of laying the meshes, because in the virtual entity model, a triangular mesh cell may form a triangular surface through the (x, y, z) coordinates of three points in the space or the (x, y) coordinates of three points in the surface. The greatest advantage of the triangular mesh cells is to reduce the amount of computation during rendering.

S203 includes creating an independently editable external feature of each model area according to the divided model areas.

Continuously taking the sofa as an example, a user may independently edit a size and color of the armrest of the sofa, or independently edit a size and color of the backrest of the sofa, and the size and color features are customized features of the created independent model area (i.e., the editable external features).

Figures 3, 4:
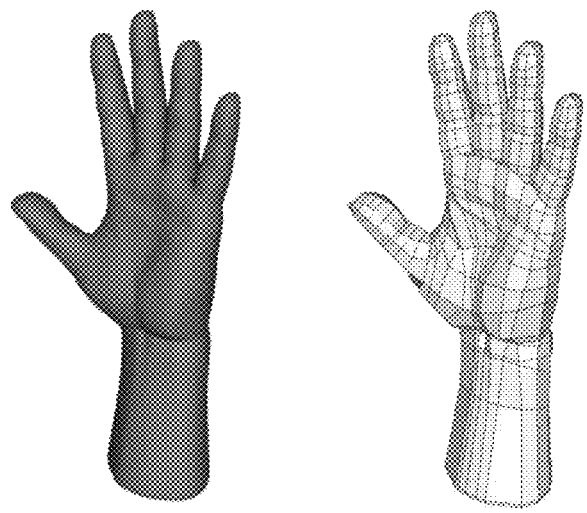
FIG. 3 is an example diagram of a virtual entity model constructed according to a real object according to some embodiments of the present disclosure.
FIG. 4 is an example diagram of dividing the virtual entity model into multiple model areas according to some embodiments of the present disclosure.

In order to better illustrate this embodiment, FIG. 3 is an example diagram of an effect of the virtual entity model constructed according to the real object according to some embodiments of the present disclosure, and FIG. 4 is an example diagram of dividing the virtual entity model into multiple model areas according to some embodiments of the present disclosure. As shown in FIG. 3 and FIG. 4, a virtual entity model is a model for one hand, and meshes are laid on the surface of the virtual entity model, and each mesh may have an independently editable external feature, i.e., the external feature of each mesh may be independently edited, such as customizedly editing a color for painting the model. In some embodiments, the hand model in the figures may alternatively be simply divided into independent model areas, such as fingers, a palm and a wrist, and further the fingers may continue to be divided according to finger joints, and then a thumb may be divided into two segments, and the other fingers may be each divided into three segments, and the first joint of the thumb in FIG. 4 is painted in black. According to the above example, it can be seen that by dividing the model areas of the virtual entity model and then creating the customized features for the independently divided model areas, the specific editing on the customized feature may be more conveniently realized.

Figure 5:
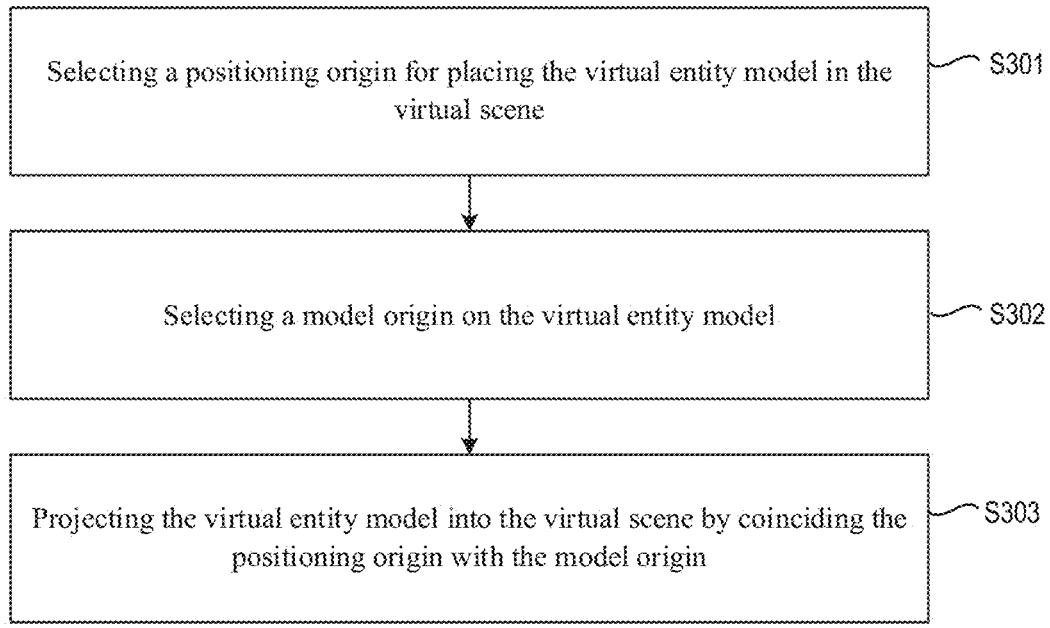
FIG. 5 is another schematic flowchart of the method for virtualized processing of an object according to some embodiments of the present disclosure.

FIG. 5 is another schematic flowchart of the method for virtualized processing of an object according to some embodiments of the present disclosure. As shown in FIG. 5, in some embodiments, the projecting the virtual entity model into the virtual scene includes steps S301 and S303.

S301 includes selecting a positioning origin for placing the virtual entity model in the virtual scene.

In the process of projecting the virtual entity model in this step, the positioning origin should be selected in the virtual scene. The position of the positioning origin may be selected according to a specific pre-set manner, and the pre-set manner may be selecting a center point of the virtual scene, or may be selecting according to a special case of the virtual scene. For example, a floor area in the virtual scene is first recognized, and then the center point of the floor area is selected. The pre-set manner may be any default manner, or may be a manual setting or even a random setting.

S302 includes selecting a model origin on the virtual entity model.

This step needs to also select a point on the virtual entity model, i.e., the model origin. The selection manner may be a random manner, or may be selecting a geometric center of the virtual entity model or other manners.

S303 includes projecting the virtual entity model into the virtual scene by coinciding the positioning origin with the model origin.

In this step, the model origin is coincided with the positioning origin. The virtual entity model may be projected by point coincidence so that the virtual entity model rotates freely around the positioning origin. The free rotation of the virtual entity model may facilitate editing the customized feature of the virtual entity model. In using the positioning manner to project the virtual entity model into the virtual scene in this step, except the coincidence between the selected points, a default manner or a random manner may be used in other spatial degrees of freedom, which is not described in detail herein.

In this embodiment, the positioning manner of the virtual entity model in the virtual scene is actually provided. By applying this manner in this embodiment, this manner may make the virtual entity model rotate freely to facilitate the editing the customized feature of the virtual entity model.

Figure 6:
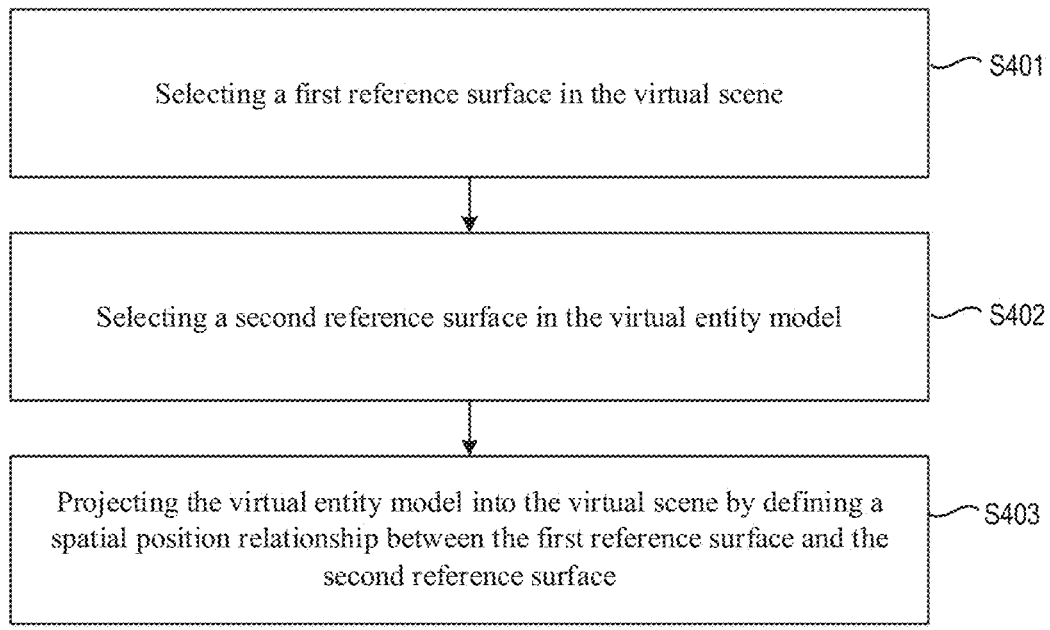
FIG. 6 is yet another schematic flowchart of the method for virtualized processing of an object according to some embodiments of the present disclosure.

FIG. 6 is another schematic flowchart of the method for virtualized processing of an object according to embodiments of the present disclosure. As shown in FIG. 6, in some embodiments, the selecting the positioning origin for placing the virtual entity model in the virtual scene includes steps S401 to S403.

S401 includes selecting a first reference surface in the virtual scene.

In this step, selecting the first reference surface may be selecting a horizontal surface in the virtual scene, or may be other surfaces. The virtual entity model may be placed on the first reference surface, and the reason for establishing the first reference surface is because the virtual entity model may be placed directly on the first reference surface of the virtual scene during the projection to establish a default projection relationship that accords with the usual human sense of space. A spatial relationship of the first reference surface in the real scene may be determined by a placement angle of a shooting device (such as a mobile phone) or by an image in the virtual scene. Specifically, the device, when shooting, may determine a spatial position relationship between the captured real scene and the virtual scene according to a built-in gyroscope, so as to find the first reference surface in the virtual scene, or acquire relevant information from the image of the virtual scene to obtain the first reference surface, where the relevant information may be a shadow in the image, an occlusion relationship between objects and the like. The selection manners explained above are just examples for a better understanding of this step.

S402 includes selecting a second reference surface in the virtual entity model.

In this step, the second reference surface in the virtual entity model is selected, and the selection manner may be a default manner or a manual manner.

S403 includes projecting the virtual entity model into the virtual scene by defining a spatial position relationship between the first reference surface and the second reference surface.

In this step, defining the first reference surface and the second reference surface is to construct a common spatial position relationship of the virtual entity model, which accords with a human sense, in the virtual scene. For example, when a computer is placed on a desktop, it is necessary to find the desktop as a first reference surface and the bottom surface of the computer as a second reference surface. When the first reference surface coincides with the second reference surface and a virtual entity model of the computer is placed on the desktop, the effect of placing the computer on the desktop may be realized.

Figure 7:
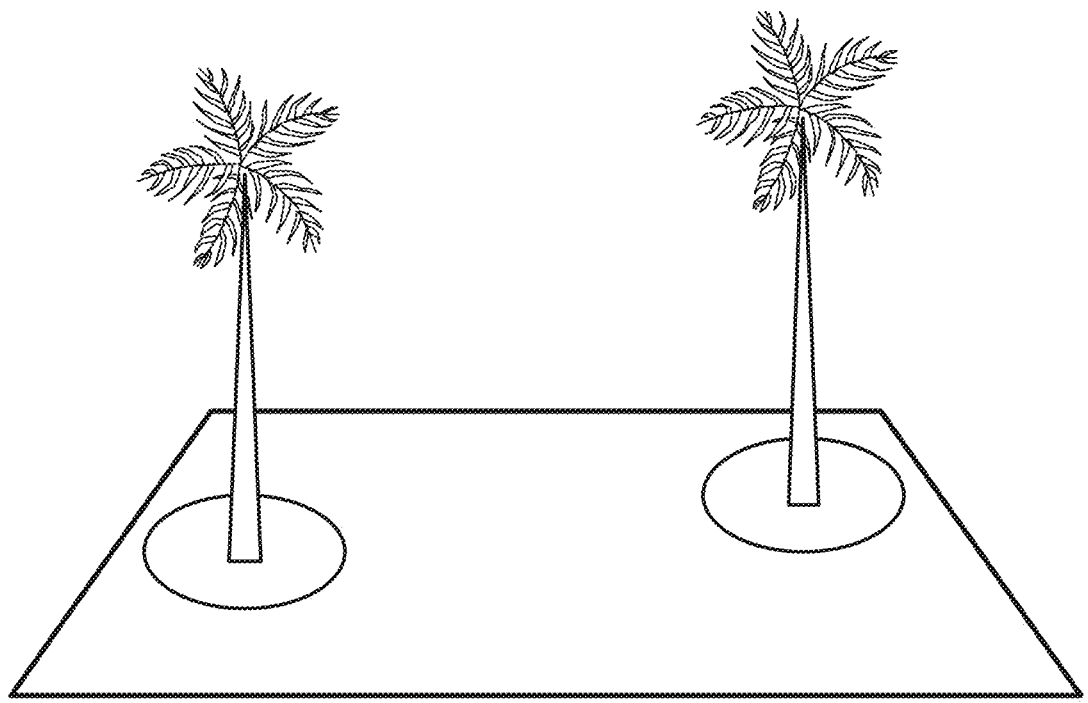
FIG. 7 is an example diagram of a model projection effect of the method for virtualized processing of an object according to some embodiments of the present disclosure.

In this embodiment, a manner of positioning the virtual entity model in a reasonable spatial manner in the virtual scene is actually provided. For better explanation of this embodiment, FIG. 7 is an example diagram of a model projection effect of the method for virtualized processing of an object according to some embodiments of the present disclosure. As shown in FIG. 7, the above embodiment is further explained, trees in the figure, i.e., virtual entity models, are placed on the desktop. The first reference surface is first selected from the virtual scene. It can be seen from the figure that the desktop should be a horizontal plane surface in the real scene. However, due to the problem of the shooting angle, the desktop is not a horizontal plane surface of orthographic projection in the image. Moreover, the image of the desktop is distorted due to the fact that the closer portion is big and the further portion is small. Therefore, a real situation of the image needs to be restored according to parameters such as an angle and focal length of shooting, and the plane surface on which the desktop is located is selected as the first reference surface. A reference surface, with which the virtual entity model may be placed in a reasonable state, may be selected as the second reference surface. Specifically, referring to FIG. 7, the second reference surface may be a ground where trees grow. Finally, after the spatial relationship between the first reference surface and the second reference surface is defined, a needed correct position of the virtual entity model in the virtual scene may be seen. Taking FIG. 7 as an example, the final effect is that the trees grow from the desktop. In addition, it should be pointed out that defining the spatial relationship between the first reference surface and the second reference surface may be executed in a pre-set automatic manner, or may be defining manually thereafter.

Figure 8:
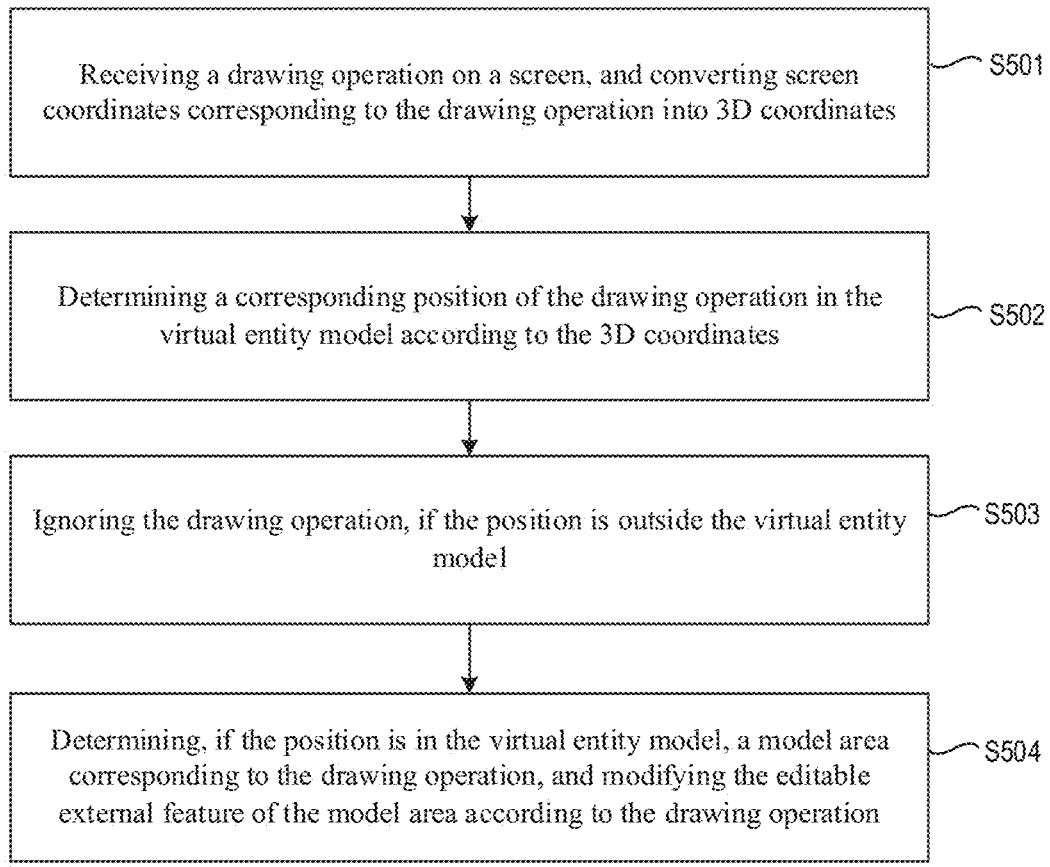
FIG. 8 is another schematic flowchart of the method for virtualized processing of an object according to some embodiments of the present disclosure.

FIG. 8 is another schematic flowchart of the method for virtualized processing of an object according to some embodiments of the present disclosure. As shown in FIG. 8, in some embodiments, an editing operation on the editable external feature of the virtual entity model may be: an operation for drawing on a screen with a brush of any color, or other operations for editing external features such as a structure size, color and pattern of the virtual entity model. Taking a drawing operation as an example below, the receiving an editing operation on the editable external feature of the virtual entity model and adjusting the virtual entity model according to the editing operation includes steps S501 to S504.

S501 includes receiving a drawing operation on a screen, and converting screen coordinates corresponding to the drawing operation into 3D coordinates.

S502 includes determining a corresponding position of the drawing operation in the virtual entity model according to the 3D coordinates.

S503 includes ignoring, if the drawing operation is outside the virtual entity model, the drawing operation.

S504 includes determining, if the drawing operation is in the virtual entity model, a model area corresponding to the drawing operation, and modifying the editable external feature of the model area according to the drawing operation.

In embodiments of the present disclosure, a mesh to be colored or textured is selected, and then a specific color or texture is selected. The color or surface image of the mesh presents the selected color or texture. Alternatively, the steps described above may be reversed, i.e., first selecting a color or texture to be presented may also realize the purpose of this step. The selection manner may be identified by a brush, and a user may edit by using the brush, which make the operation more vivid.

Figures 9, 10:
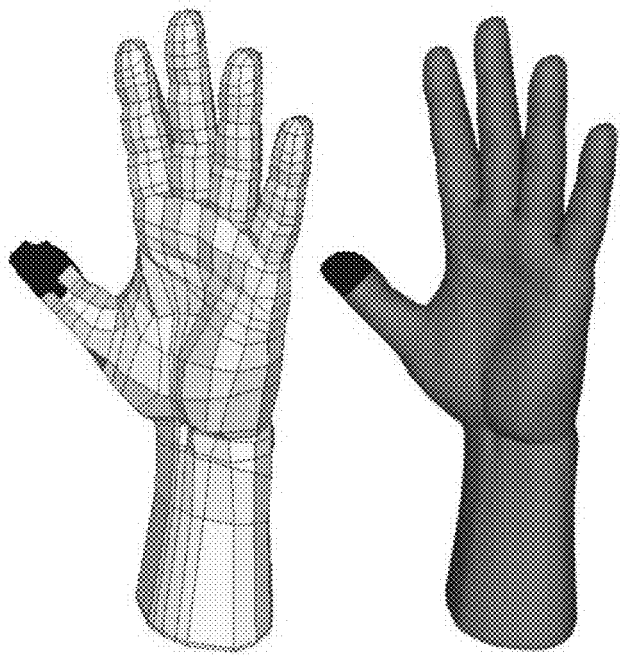
FIG. 9 is an example diagram of editing an editable external feature of the virtual entity model according to some embodiments of the present disclosure.
FIG. 10 is an example diagram of an adjusted virtual entity model according to some embodiments of the present disclosure.

For a better explanation of this embodiment, FIG. 9 is an example diagram of editing an editable external feature of the virtual entity model according to some embodiments of the present disclosure, and FIG. 10 is an example diagram of an adjusted virtual entity model according to embodiments of the present disclosure. As shown in FIG. 9 and FIG. 10, taking the coloring the hand model in figures as an example, a user may directly color an area of a single mesh laid on the virtual entity model, and the thumb top of the hand model in FIG. 10 shows an effect of coloring multiple mesh cells.

Listed below are the mesh space coordinates and texture space coordinates of the hand model of the method for virtualized processing of an object according to some embodiments of the present disclosure. In this embodiment, the above method may also be used to texture the virtual entity model, that is, a single mesh area is first textured (a mode of UV mapping may be used), and finally the texture editing work for the entire hand model is completed.

```
mtllib cube.mt1
g default
v       -0.500000       -0.500000       0.500000
v        0.500000       -0.500000       0.500000
v       -0.500000        0.500000       0.500000
v        0.500000        0.500000       0.500000
v       -0.500000        0.500000      -0.500000
v        0.500000        0.500000      -0.500000
v       -0.500000       -0.500000      -0.500000
v        0.500000       -0.500000      -0.500000
vt       0.001992        0.001992
vt       0.998008        0.001992
vt       0.001992        0.998008
vt       0.998008        0.998008
vt       0.001992        0.001992
vt       0.998008        0.001992
vt       0.001992        0.998008
vn       0.000000        0.000000       1.000000
vn       0.000000        0.000000       1.000000
vn       0.000000        0.000000       1.000000
vn       0.000000        0.000000       1.000000
vn       0.000000        1.000000       0.000000
vn       0.000000        1.000000       0.000000
vn       0.000000        1.000000       0.000000
vn       0.000000        1.000000       0.000000
vn       0.000000        0.000000      -1.000000
g pCube1
usemtl file1SG
f   1/1/1       2/2/2       3/3/3
f   3/3/3       2/2/2       4/4/4
s   2
f   3/13/5      4/14/6      5/15/7
f   5/15/7      4/14/6      6/16/8
s   3
f   5/21/9      6/22/10     7/23/11
f   7/23/11     6/22/10     8/24/12
s   4
f   7/17/13     8/18/14     1/19/15
f   1/19/15     8/18/14     2/20/16
s   5
f   2/5/17      8/6/18      4/7/19
f   4/7/19      8/6/18      6/8/20
s   6
f   7/9/21      1/10/22     5/11/23
f   5/11/23     1/10/22     3/12/24
```

Figure 11:
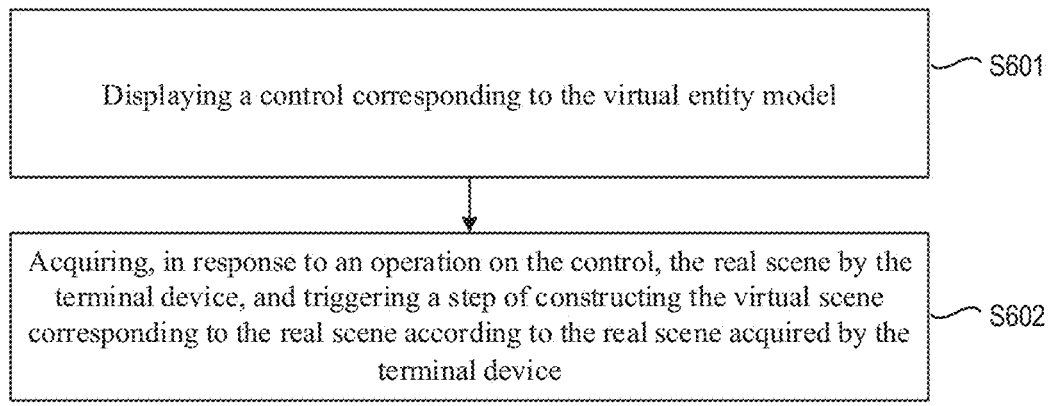
FIG. 11 is another schematic flowchart of the method for virtualized processing of an object according to some embodiments of the present disclosure.

FIG. 11 is a schematic flowchart of the method for virtualized processing of an object according to some embodiments of the present disclosure. As shown in FIG. 11, in some embodiments, when the virtual entity model is displayed in step S101, the method further includes steps S601 and S602.

S601 includes displaying a control corresponding to the virtual entity model.

In this step, the control corresponding to the virtual entity model is created, when a consumer sees a virtual entity model that the consumer needs to buy, the consumer may be guided to a mode of object virtualization customization, and an identifier is an entry to trigger this function.

S602 includes acquiring, in response to an operation on the control, the real scene by the terminal device, and triggering a step of constructing the virtual scene corresponding to the real scene according to the real scene acquired by the terminal device.

In this step, the control is clicked to trigger a subsequent step, such as turning on the camera function of a mobile phone to acquire the real scene to construct the virtual scene. However, this embodiment is merely an example, and other relevant operations may also be triggered.

Figure 12:
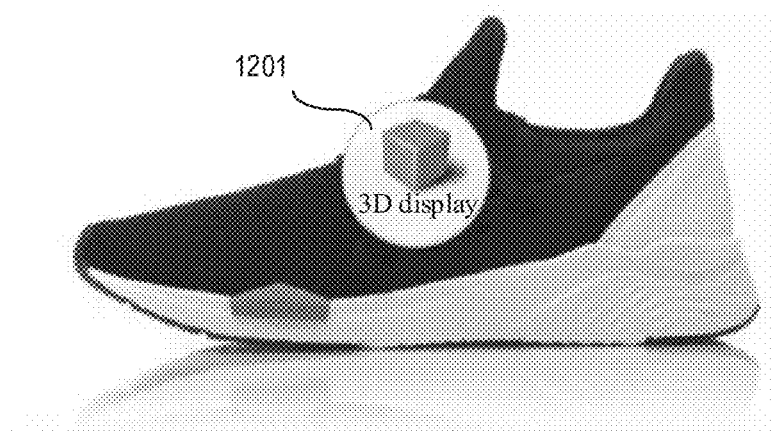
FIG. 12 is a schematic diagram of an application interface of the method for virtualized processing of an object according to some embodiments of the present disclosure.

For a better explanation of this embodiment, a specific example of a sports shoe is described. FIG. 12 is a schematic diagram of an application interface of the method for virtualized processing of an object according to some embodiments. As shown in FIG. 12, the "3D display" button 1201 in the middle of the sports shoe is the corresponding control in this embodiment, and when the button is clicked, the camera of the mobile phone is triggered to take a picture or take a video to construct the virtual scene.

Figure 13:
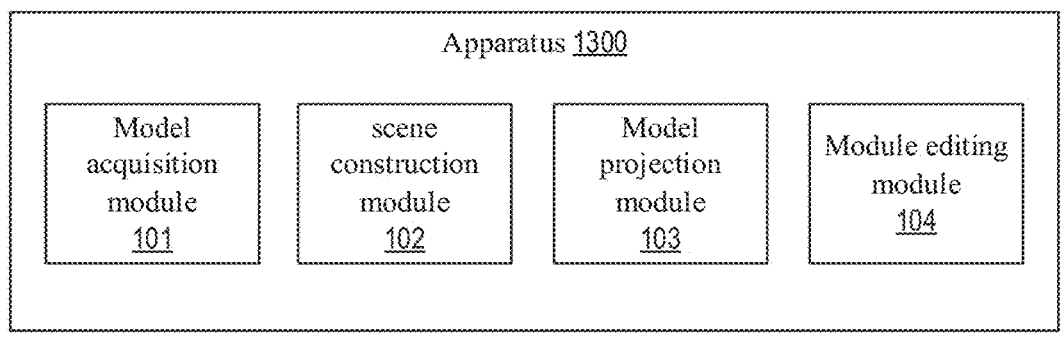
FIG. 13 is a schematic structural diagram of an apparatus for virtualized processing of an object according to some embodiments of the present disclosure.

FIG. 13 is a schematic structural diagram of an apparatus for virtualized processing of an object according to some embodiments of the present disclosure. As shown in FIG. 13, in some embodiments, the apparatus 1300 for virtualized processing of an object is provided, the apparatus including:

a model acquisition module 101 configured to acquire and display a virtual entity model having an editable external feature and constructed according to a real object;

a scene construction module 102 configured to construct a virtual scene corresponding to a real scene according to the real scene;

a model projection module 103 configured to project the virtual entity model into the virtual scene; and a module editing module 104 configured to receive an editing operation on the editable external feature of the virtual entity model, adjust the editable external feature according to the editing operation to obtain an adjusted virtual entity model, and display the adjusted virtual entity model in the virtual scene.

In some embodiments, the virtual entity model is divided into multiple model areas; and each model area has an independently editable external feature.

Figure 14:
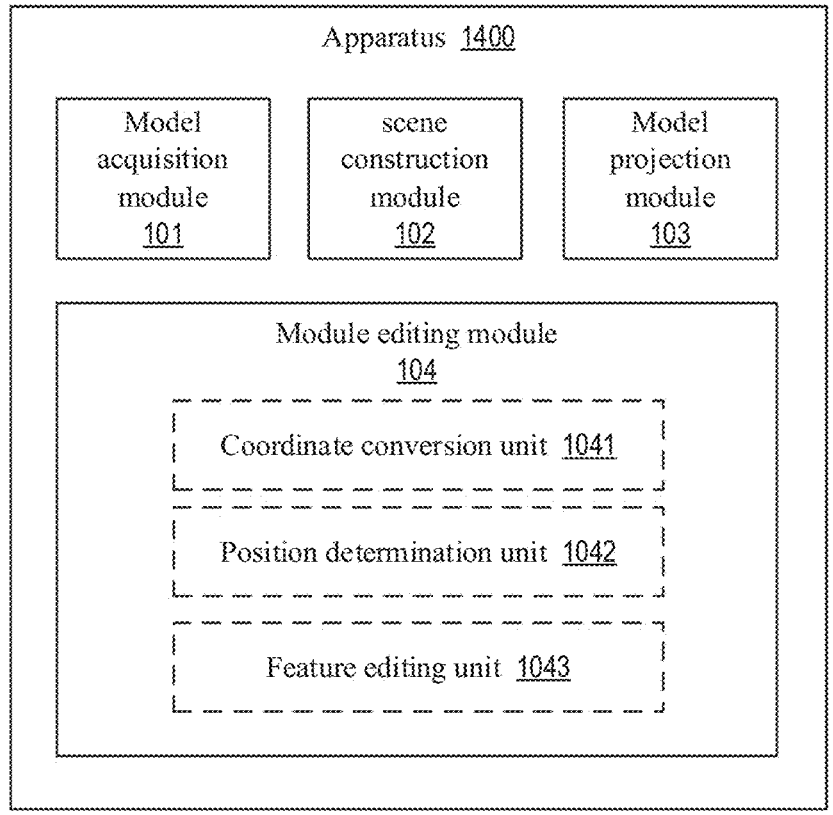
FIG. 14 is another schematic structural diagram of the apparatus for virtualized processing of an object according to some embodiments of the present disclosure.

FIG. 14 is another schematic structural diagram of the apparatus for virtualized processing of an object according to some embodiments of the present disclosure. As shown in FIG. 14, the module editing module 104 further includes:

a coordinate conversion unit 1041 configured to receive a drawing operation on a screen of the terminal device, and convert screen coordinates corresponding to the drawing operation into 3D coordinates;

a position determination unit 1042 configured to determine a corresponding position of the drawing operation in the virtual entity model according to the 3D coordinates; and a feature editing unit 1043 configured to ignore, when the position determination unit 1042 determines that the position of the drawing operation is outside the virtual entity model, the drawing operation; and determine, when the position determination unit 1042 determines that the position of the drawing operation is in the virtual entity model, a model area corresponding to the drawing operation, and modify the editable external feature of the model area according to the drawing operation.

Figure 15:
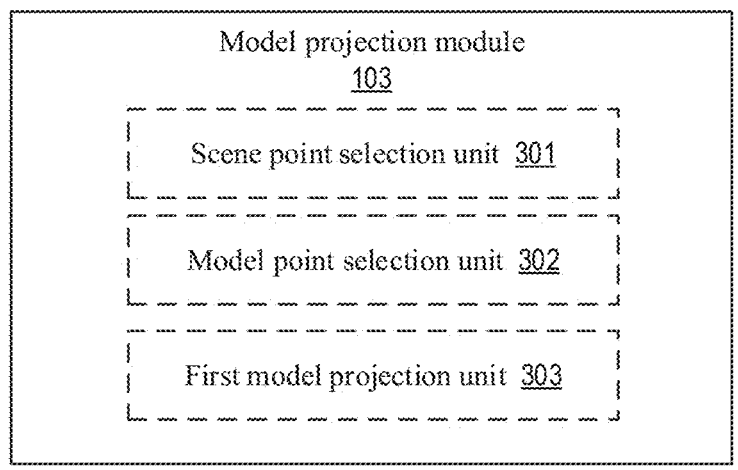
FIG. 15 is another schematic structural diagram of the apparatus for virtualized processing of an object according to some embodiments of the present disclosure.

FIG. 15 is another schematic structural diagram of the apparatus for virtualized processing of an object according to some embodiments of the present disclosure. As shown in FIG. 15, in some embodiments, the model projection module 103 further includes:

a scene point selection unit 301 configured to select a positioning origin for placing the virtual entity model in the virtual scene;

a model point selection unit 302 configured to select a model origin on the virtual entity model; and a first model projection unit 303 configured to project the virtual entity model into the virtual scene by coinciding the positioning origin with the model origin.

Figure 16:
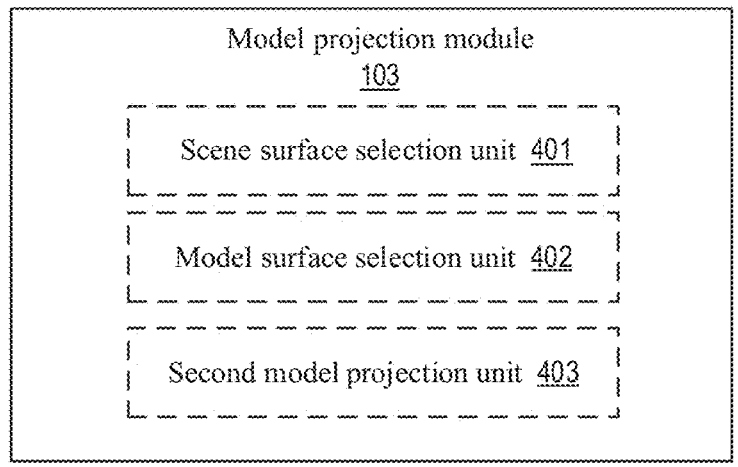
FIG. 16 is another schematic structural diagram of the apparatus for virtualized processing of an object according to some embodiments of the present disclosure.

FIG. 16 is a schematic structural diagram of the apparatus for virtualized processing of an object according to some embodiments of the present disclosure. As shown in FIG. 16, in some embodiments, the model projection module 103 further includes:

a scene surface selection unit 401 configured to select a first reference surface in the virtual scene;

a model surface selection unit 402 configured to select a second reference surface in the virtual entity model; and a second model projection unit 403 configured to project the virtual entity model into the virtual scene by defining a spatial position relationship between the first reference surface and the second reference surface.

Figure 17:
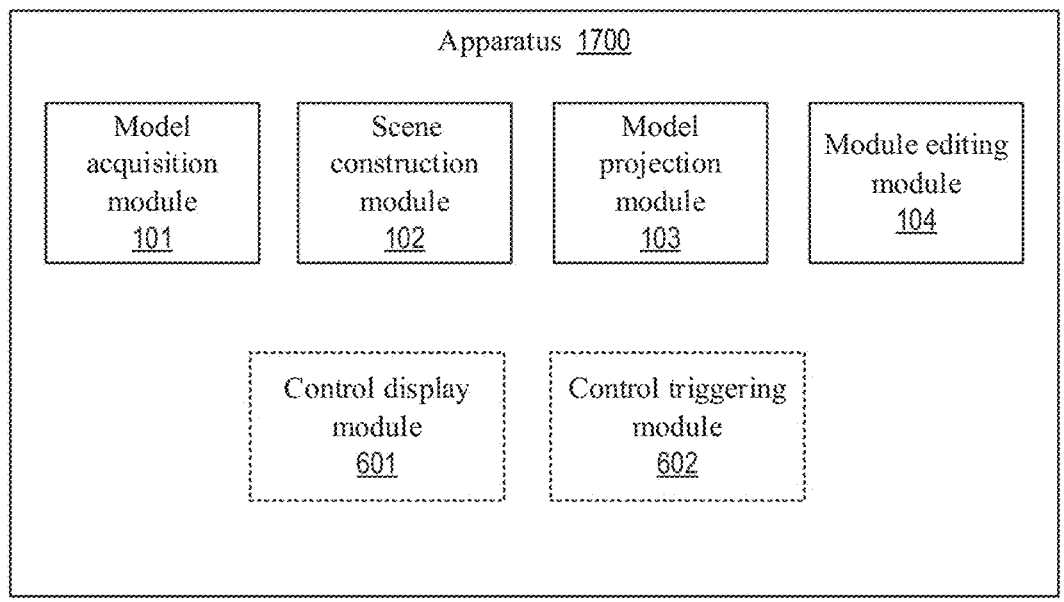
FIG. 17 is another schematic structural diagram of the apparatus for virtualized processing of an object according to some embodiments of the present disclosure.

FIG. 17 is another schematic structural diagram of the apparatus for virtualized processing of an object according to some embodiments of the present disclosure. As shown in FIG. 17, in some embodiments, the apparatus 1700 further includes:

a control display module 601 configured to display a control corresponding to the virtual entity model when a module display module displays the virtual entity model; and a control triggering module 602 configured to trigger, in response to an operation on the control, the scene construction module 102 to acquire the real scene, and execute a step of constructing the virtual scene corresponding to the real scene according to the real scene.

Figure 18:
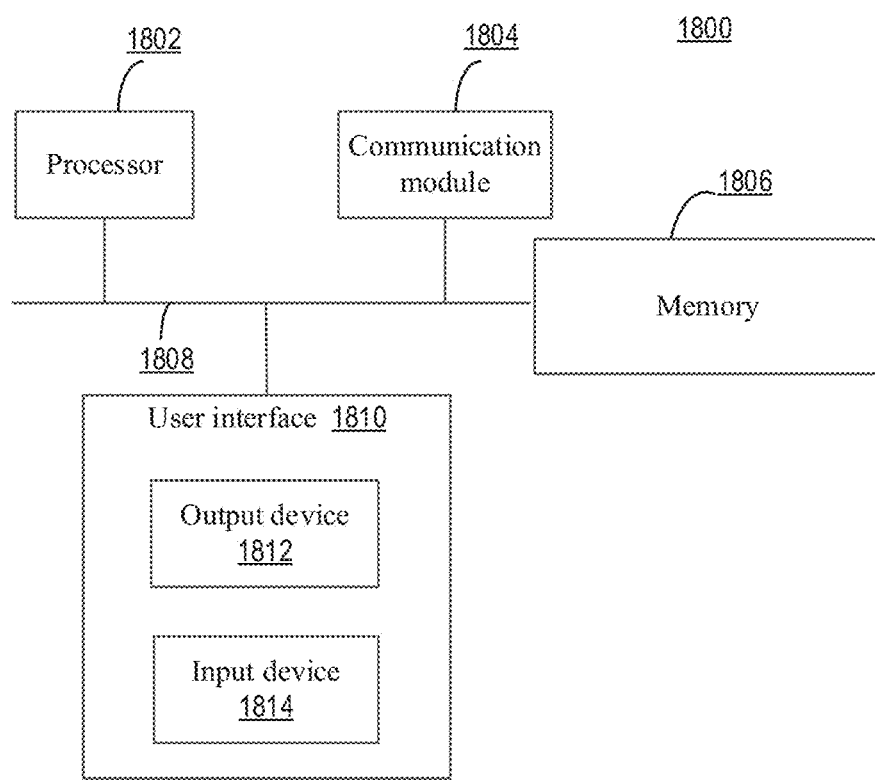
FIG. 18 is a schematic structural diagram of an electronic device according to some embodiments of the present disclosure.

In addition, embodiments of the present disclosure further provide an electronic device. As shown in FIG. 18, the electronic device 1800 includes a memory 1806, a processor 1802, a communication module 1804, a user interface 1810 and a communication bus 1808 for interconnecting these components.

The memory 1806 may be a high-speed random access memory, such as a DRAM, a SRAM, a DDR RAM or other random access solid-state storage devices, or may be a non-volatile memory, such as one or more magnetic disk storage devices, optical disk storage devices, flash storage devices or other non-volatile solid-state storage devices.

The user interface 1810 may include one or more output devices 1812, and one or more input devices 1814.

The memory 1806 stores a set of instructions executable by the processor 1802, including a program for implementing the processing flow in the above embodiments, and the processor 1802 implements the steps of the method for virtualized processing of an object when executing the program.

In some embodiments, the present disclosure provides a non-volatile computer-readable storage medium storing a computer program, which when executed by a processor, implements the steps of the method for virtualized processing of an object when executing the program.

The above are merely preferred embodiments of the present disclosure, and are not intended to limit the present disclosure. Any modification, equivalent replacement, improvement and the like, which fall within the spirit and principles of the present disclosure, are intended to be included within the scope of the present disclosure.

What is claimed is:

1. A method for virtualized processing of an object, executed by a terminal device comprising a hardware processor, the method comprising:

acquiring and displaying a virtual entity model having an editable external feature and constructed according to a real object, wherein a mesh is laid on a surface of the virtual entity model, and the virtual entity model is divided according to the mesh into a plurality of model areas each having an independently editable external feature;

simultaneously displaying a control button and the virtual entity model;

clicking the control button simultaneously displayed with the virtual entity model;

triggering a camera of the terminal device to acquire a real scene, in response to clicking the control button simultaneously displayed with the virtual entity model;

constructing a virtual scene corresponding to the real scene according to the real scene acquired by the camera of the terminal device;

projecting the virtual entity model into the virtual scene; and receiving an editing operation on the editable external feature of the virtual entity model, adjusting the editable external feature according to the editing operation to obtain an adjusted virtual entity model, and displaying the adjusted virtual entity model in the virtual scene.

2. The method for virtualized processing of the object according to claim 1, wherein the receiving an editing operation on the editable external feature of the virtual entity model, adjusting the virtual entity model according to the editing operation, comprises:

receiving a drawing operation on a screen of the terminal device, and converting screen coordinates corresponding to the drawing operation into 3D coordinates;

determining a corresponding position of the drawing operation in the virtual entity model according to the 3D coordinates;

ignoring, in response to determining that the position is outside the virtual entity model, the drawing operation; and determining, in response to determining that the position is in the virtual entity model, a model area corresponding to the drawing operation, and modifying the editable external feature of the model area according to the drawing operation.

3. The method for virtualized processing of the object according to claim 1, wherein the projecting the virtual entity model into the virtual scene, comprises:

selecting a positioning origin for placing the virtual entity model in the virtual scene;

selecting a model origin on the virtual entity model; and projecting the virtual entity model into the virtual scene by coinciding the positioning origin with the model origin.

4. The method for virtualized processing of the object according to claim 1, wherein the projecting the virtual entity model into the virtual scene, comprises:

selecting a first reference surface in the virtual scene;
selecting a second reference surface in the virtual entity model; and
projecting the virtual entity model into the virtual scene by defining a spatial position relationship between the first reference surface and the second reference surface.

5. The method for virtualized processing of the object according to claim 1, wherein each of the model areas is a mesh cell having the independently editable external feature.

6. An apparatus for virtualized processing of the object, the apparatus comprising:
at least one processor; and
a memory, wherein the memory stores instructions executable by the at least one processor, and the instructions, when executed by the at least one processor, cause the at least one processor to perform operations comprising:
acquiring and display a virtual entity model having an editable external feature and constructed according to a real object, wherein a mesh is laid on a surface of the virtual entity model, and the virtual entity model is divided according to the mesh into a plurality of model areas each having an independently editable external feature;
simultaneously displaying a control button and the virtual entity model;
clicking the control button simultaneously displayed with the virtual entity model;
triggering a camera of the terminal device to acquire a real scene, in response to clicking the control button simultaneously displayed with the virtual entity model;
constructing a virtual scene corresponding to the real scene according to the real scene;
projecting the virtual entity model into the virtual scene; and
receiving an editing operation on the editable external feature of the virtual entity model, adjusting the editable external feature according to the editing operation to obtain an adjusted virtual entity model, and displaying the adjusted virtual entity model in the virtual scene.

7. The apparatus for virtualized processing of the object according to claim 6, wherein the receiving an editing operation on the editable external feature of the virtual entity model, adjusting the virtual entity model according to the editing operation, comprises:
receiving a drawing operation on a screen of the terminal device, and convert screen coordinates corresponding to the drawing operation into 3D coordinates;
determining a corresponding position of the drawing operation in the virtual entity model according to the 3D coordinates; and
ignoring, in response to determining that the position of the drawing operation is outside the virtual entity model, the drawing operation, determining, in response to determining that the position of the drawing operation is in the virtual entity model, a model area corresponding to the drawing operation, and modifying the editable external feature of the model area according to the drawing operation.

8. The apparatus for virtualized processing of the object according to claim 6, wherein the projecting the virtual entity model into the virtual scene:
selecting a positioning origin for placing the virtual entity model in the virtual scene;
selecting a model origin on the virtual entity model; and
projecting the virtual entity model into the virtual scene by coinciding the positioning origin with the model origin.

9. The apparatus for virtualized processing of the object according to claim 6, wherein the projecting the virtual entity model into the virtual scene comprises:
selecting a first reference surface in the virtual scene;
selecting a second reference surface in the virtual entity model; and
projecting the virtual entity model into the virtual scene by defining a spatial position relationship between the first reference surface and the second reference surface.

10. A non-transitory computer-readable storage medium storing a computer program, which when executed by a processor, causes the processor to perform operations comprising:
acquiring and displaying a virtual entity model having an editable external feature and constructed according to a real object, wherein a mesh is laid on a surface of the virtual entity model, and the virtual entity model is divided according to the mesh into a plurality of model areas each having an independently editable external feature;
simultaneously displaying a control button and the virtual entity model;
clicking the control button simultaneously displayed with the virtual entity model;
triggering a camera of the terminal device to acquire a real scene, in response to clicking the control button simultaneously displayed with the virtual entity model;
constructing a virtual scene corresponding to the real scene according to the real scene acquired by the terminal device;
projecting the virtual entity model into the virtual scene; and
receiving an editing operation on the editable external feature of the virtual entity model, adjusting the editable external feature according to the editing operation to obtain an adjusted virtual entity model, and displaying the adjusted virtual entity model in the virtual scene.

11. The storage medium according to claim 10, wherein the receiving an editing operation on the editable external feature of the virtual entity model, adjusting the virtual entity model according to the editing operation, comprises:
receiving a drawing operation on a screen of the terminal device, and converting screen coordinates corresponding to the drawing operation into 3D coordinates;
determining a corresponding position of the drawing operation in the virtual entity model according to the 3D coordinates;
ignoring, in response to determining that the position is outside the virtual entity model, the drawing operation; and
determining, in response to determining that the position is in the virtual entity model, a model area corresponding to the drawing operation, and modifying the editable external feature of the model area according to the drawing operation.

12. The storage medium according to claim 10, wherein the projecting the virtual entity model into the virtual scene, comprises:
selecting a positioning origin for placing the virtual entity model in the virtual scene;
selecting a model origin on the virtual entity model; and projecting the virtual entity model into the virtual scene by coinciding the positioning origin with the model origin.

13. The storage medium according to claim 10, wherein the projecting the virtual entity model into the virtual scene, comprises:
  selecting a first reference surface in the virtual scene;
  selecting a second reference surface in the virtual entity model; and
  projecting the virtual entity model into the virtual scene by defining a spatial position relationship between the first reference surface and the second reference surface.

* * * * *